(12) United States Patent
Sawada et al.

(10) Patent No.: US 9,902,272 B2
(45) Date of Patent: *Feb. 27, 2018

(54) CONTROL DEVICE FOR ELECTRIC MOTOR VEHICLE AND CONTROL METHOD FOR ELECTRIC MOTOR VEHICLE

(71) Applicant: Nissan Motor Co., Ltd., Yokohama-Shi, Kanagawa (JP)

(72) Inventors: Akira Sawada, Kanagawa (JP); Ken Ito, Kanagawa (JP); Takashi Nakajima, Kanagawa (JP); Yuji Katsumata, Kanagawa (JP); Hiroyuki Komatsu, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 139 days.

This patent is subject to a terminal disclaimer.

(21) Appl. No.: 15/100,886

(22) PCT Filed: Dec. 2, 2013

(86) PCT No.: PCT/JP2013/082344
§ 371 (c)(1),
(2) Date: Jun. 1, 2016

(87) PCT Pub. No.: WO2015/083213
PCT Pub. Date: Jun. 11, 2015

(65) Prior Publication Data
US 2016/0297303 A1    Oct. 13, 2016

(51) Int. Cl.
*B60L 7/14*    (2006.01)
*B60L 7/18*    (2006.01)
(Continued)

(52) U.S. Cl.
CPC ............... *B60L 7/14* (2013.01); *B60L 3/08* (2013.01); *B60L 7/18* (2013.01); *B60L 15/20* (2013.01);
(Continued)

(58) Field of Classification Search
CPC .... B60L 7/14; B60L 3/08; B60L 15/20; B60L 15/2018; B60L 7/18; B60L 2240/12;
(Continued)

(56) References Cited

U.S. PATENT DOCUMENTS

2010/0004806 A1*  1/2010  Soma .................. B60K 6/445
                                                     701/22
2013/0116874 A1   5/2013  Ichinose et al.
2014/0379190 A1   12/2014 Sawada

FOREIGN PATENT DOCUMENTS

JP    08-009508 A    1/1996
JP    08-079907 A    3/1996
(Continued)

OTHER PUBLICATIONS

Masamichi Ogasa et al., "Plant-test of Electrical Braking to Zero Speed for Railway Vehicles", The Transactions of the Institute of Electrical Engineers of Japan. D, vol. 199 (1999), No. 3, The Institute of Electrical Engineers of Japan, 1999, pp. 405 to 411.

*Primary Examiner* — Yuen H Wong
(74) *Attorney, Agent, or Firm* — Young Basile Hanlon & MacFarlane, P.C.

(57) ABSTRACT

A control device for electric motor vehicle is configured to decelerate by a regenerative braking force of the motor when an accelerator operation amount decreases or becomes zero. The control device detects the accelerator operation amount, calculates a motor torque command value, and controls the motor on the basis of the motor torque command value calculated. The control device detects a speed parameter proportional to a traveling speed and calculates a feedback torque for stopping the vehicle on the basis of the speed (Continued)

parameter detected. The control device also estimates a disturbance torque acting on the motor and converges, as the speed parameter is reduced, the motor torque command value to the disturbance torque on the basis of the feedback torque when the accelerator operation amount decreases or becomes zero and the electric motor vehicle stops shortly. The control device adjusts the feedback torque according to the disturbance torque.

10 Claims, 18 Drawing Sheets

(51) Int. Cl.
*B60L 15/20* (2006.01)
*B60L 3/08* (2006.01)
*H02P 3/14* (2006.01)
*H02P 3/18* (2006.01)
*H02P 3/06* (2006.01)

(52) U.S. Cl.
CPC ............ *B60L 15/2018* (2013.01); *H02P 3/14* (2013.01); *H02P 3/18* (2013.01); *B60L 2240/12* (2013.01); *B60L 2240/642* (2013.01); *H02P 3/06* (2013.01); *Y02T 10/645* (2013.01); *Y02T 10/7275* (2013.01); *Y02T 10/7291* (2013.01); *Y02T 90/16* (2013.01)

(58) Field of Classification Search
CPC ........ B60L 2240/642; H02P 3/18; H02P 3/14; H02P 3/06; Y02T 10/645; Y02T 10/7291; Y02T 10/7275; Y02T 90/16
See application file for complete search history.

(56) References Cited

FOREIGN PATENT DOCUMENTS

| | | |
|---|---|---|
| JP | 09-130911 A | 5/1997 |
| JP | 2001218302 A | 8/2001 |
| JP | 2011259645 A | 12/2011 |
| WO | 2013115042 A1 | 8/2013 |

* cited by examiner

CONTROL DEVICE FOR ELECTRIC MOTOR VEHICLE AND CONTROL METHOD FOR ELECTRIC MOTOR VEHICLE

TECHNICAL FIELD

The present invention relates to a control device for electric motor vehicle and a control method for electric motor vehicle.

BACKGROUND

Conventionally, a regenerative brake control device for electric vehicle is known which is provided with setting means capable of arbitrarily setting a regenerative braking force of a motor and regenerates the motor by the regenerative braking force set by the setting means (see JP8-79907A).

SUMMARY

However, if the regenerative braking force set by the setting means is large, a problem of generating vibration in a front-back direction of a vehicle body arises when the electric vehicle is decelerated by the set regenerative braking force and the speed becomes 0.

The present invention aims to provide a technology for suppressing the generation of vibration in a front-back direction of a vehicle body in stopping an electric motor vehicle with a regenerative braking force.

According to one aspect of the present invention, a control device for electric motor vehicle uses a motor as a traveling drive source and is configured to decelerate by a regenerative braking force of the motor when an accelerator operation amount decreases or becomes zero. The control device detects the accelerator operation amount, calculates a motor torque command value, and controls the motor on the basis of the motor torque command value calculated. The control device detects a speed parameter proportional to a traveling speed of the electric motor vehicle and calculates a feedback torque for stopping the electric motor vehicle on the basis of the speed parameter detected. The control device also estimates a disturbance torque acting on the motor and converges, as the speed parameter is reduced, the motor torque command value to the disturbance torque on the basis of the feedback torque when the accelerator operation amount decreases or becomes zero and when the electric motor vehicle stops shortly. The control device adjusts the feedback torque according to the disturbance torque.

DETAILED DESCRIPTION OF THE EMBODIMENTS

Figure 1:
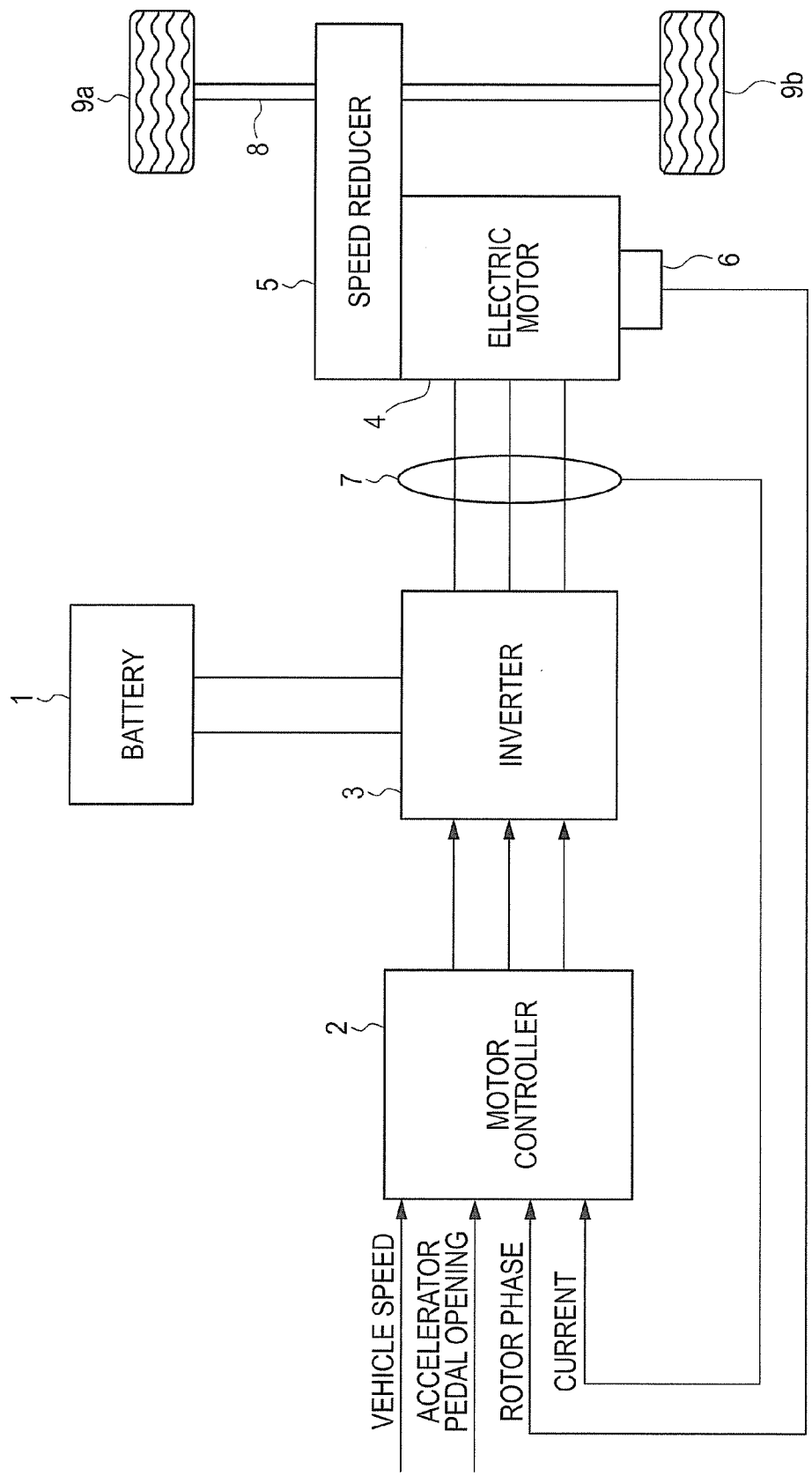
FIG. 1 is a block diagram showing a main configuration of an electric vehicle with a control device for electric vehicle in one embodiment.

FIG. 1 is a block diagram showing a main configuration of an electric vehicle with a control device for electric motor vehicle in one embodiment. The control device for electric motor vehicle of the present invention includes an electric motor as part or the entirety of a drive source of the vehicle and is applicable to an electric motor vehicle capable of traveling by a drive force of the electric motor. Electric motor vehicles include not only electric vehicles, but also hybrid vehicles and fuel cell vehicles. Particularly, the control device for electric motor vehicle in the present embodiment can be applied to a vehicle capable of controlling the acceleration/deceleration and the stop of the vehicle only by the operation of an accelerator pedal. In this vehicle, a driver depresses the accelerator pedal during acceleration and reduces or zeroes the amount of depression of the accelerator pedal during deceleration or during stop.

A motor controller 2 has signals indicating vehicle states such as a vehicle speed (traveling speed of the electric motor vehicle) V, an accelerator pedal opening AP, a rotor phase α of an electric motor (three-phase AC motor) 4, currents iu, iv and iw of the electric motor 4 input thereto in the form of digital signals, and generates PWM signals for controlling the electric motor 4 on the basis of the input signals. Further, the motor controller 2 generates a drive signal for an inverter 3 according to the generated PWM signals.

The inverter 3 includes, for example, two switching elements (e.g. power semiconductor elements such as IGBTs or MOS-FETs) for each phase, converts a direct current supplied from a battery 1 into an alternating current by turning on and off the switching elements according to the drive signal, and causes a desired current to flow into the electric motor 4.

The electric motor 4 generates a drive force by the alternating current supplied from the inverter 3 and transmits the drive force to left and right drive wheels 9a, 9b via a speed reducer 5 and a drive shaft 8. Further, when being rotated following the rotation of the drive wheels 9a, 9b during the travel of the vehicle, the electric motor 4 generates a regenerative drive force, thereby collecting kinetic energy of the vehicle as electrical energy. In this case, the inverter 3 converts an alternating current generated during the regenerative operation of the electric motor 4 into a direct current and supplies it to the battery 1.

A current sensor 7 detects three-phase alternating currents iu, iv and iw flowing in the electric motor 4. However, since the sum of the three-phase alternating currents is 0, the currents of arbitrary two phases may be detected and the current of the remaining one phase may be obtained by calculation.

A rotation sensor 6 is, for example, a resolver or an encoder and detects the rotor phase α of the electric motor 4.

Figure 2:
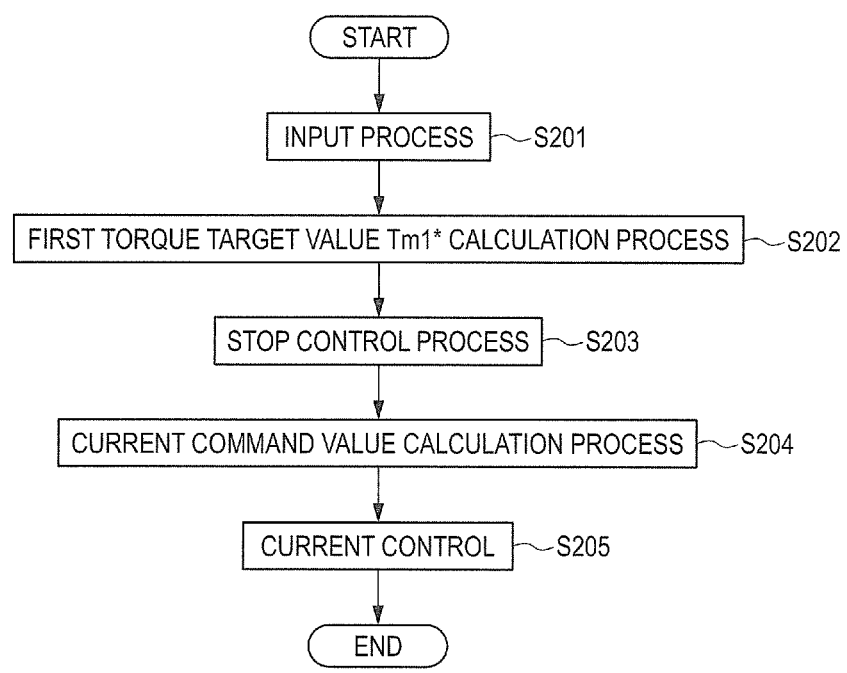
FIG. 2 is a flow chart showing the flow of a motor current control process performed by a motor controller.

FIG. 2 is a flow chart showing the flow of a motor current control process performed by the motor controller 2.

In Step S201, signals indicating the vehicle states are input. Here, the vehicle speed V (km/h), the accelerator pedal opening AP (%), the rotor phase α (rad) of the electric motor 4, a rotation speed Nm (rpm) of the electric motor 4, the three-phase alternating currents iu, iv and iw flowing in the electric motor 4, and a direct-current voltage value Vdc (V) between the battery 1 and the inverter 3 are input.

The vehicle speed V (km/h) is obtained by an unillustrated vehicle speed sensor or through communication by another controller. Alternatively, a vehicle speed v (m/s) may be obtained by multiplying a rotor mechanical angular velocity ωm by a tire dynamic radius R and dividing the product by a gear ratio of a final gear, then the quotient is multiplied by 3600/1000 for unit conversion, thereby obtaining the vehicle speed V (km/h).

The accelerator pedal opening AP (%) is obtained from an unillustrated accelerator pedal opening sensor or through communication from another controller such as an unillustrated vehicle controller.

The rotor phase α (rad) of the electric motor 4 is obtained from the rotation sensor 6. The rotation speed Nm (rpm) of the electric motor 4 is obtained by dividing a rotor angular velocity ω (electric angle) by a pole pair number P of the electric motor 4 to obtain the motor rotation speed ωm (rad/s), which is a mechanical angular velocity of the electric motor 4, and multiplying the obtained motor rotation speed ωm by 60/(2π). The rotor angular velocity ω is obtained by differentiating the rotor phase α.

The currents iu, iv and iw (A) flowing in the electric motor 4 are obtained from the current sensor 7.

The direct-current voltage value Vdc (V) is obtained from a voltage sensor (not shown) provided in a direct-current power supply line between the battery 1 and the inverter 3 or a power supply voltage value transmitted from a battery controller (not shown).

Figure 3:
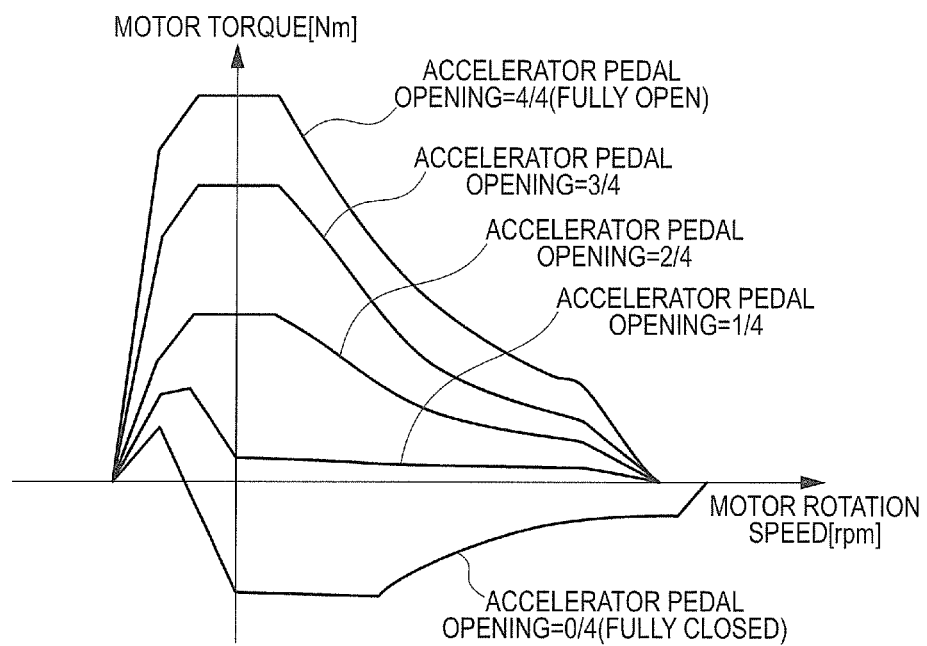
FIG. 3 is a graph showing an example of an accelerator pedal opening-torque table.

In Step S202, a first torque target value Tm1* is set. Specifically, the first torque target value Tm1* is set on the basis of the accelerator pedal opening AP and the motor rotation speed ωm input in Step S201 by referring to an accelerator pedal opening-torque table shown in FIG. 3. As described above, the control device for electric motor vehicle in the present embodiment is applicable to a vehicle capable of controlling the acceleration/deceleration and the stop of the vehicle only by the operation of an accelerator pedal. To enable the vehicle to stop at least by fully closing the accelerator pedal, a motor torque is set to increase a motor regeneration amount when the accelerator pedal opening is 0 (fully closed) in the accelerator pedal opening-torque table shown in FIG. 3. Specifically, when the motor rotation speed is positive and at least the accelerator pedal opening is 0 (fully closed), a negative motor torque is set so that a regenerative braking force works. However, the accelerator pedal opening-torque table is not limited to the one shown in FIG. 3.

In Step S203, a stop control process is performed to execute such a control that the electric motor vehicle is stopped by the regenerative braking force of the electric motor 4. Specifically, a moment just before the electric motor vehicle stops is judged, the first torque target value Tm1* calculated in Step S202 is set as a motor torque command value Tm* before the moment just before the stop, and a second torque target value Tm2* which converges to a value balanced with a disturbance torque with a reduction in the motor rotation speed is set as the motor torque command value Tm* after the moment just before the stop. This second torque target value Tm2* is a positive torque on an uphill road, a negative torque on a downhill road and substantially zero on a flat road (a level road). In this way, a vehicle stopped state can be maintained regardless of a gradient of a road surface as described later. The detail of the stop control process is described later.

In Step S204, a d-axis current target value id* and a q-axis current target value iq* are obtained on the basis of the motor torque target value Tm* calculated in Step S203, the motor rotation speed ωm and the direct-current voltage value Vdc. For example, a table defining a relationship of the d-axis current target value id* and the q-axis current target value iq* with the torque command value, the motor rotation speed and the direct-current voltage value is prepared in advance and the d-axis current target value id* and the q-axis current target value iq* are obtained by referring to this table.

In Step S205, a current control is executed to match a d-axis current id and a q-axis current iq with the d-axis current target value id* and the q-axis current target value iq* obtained in Step S204. To this end, the d-axis current id and the q-axis current iq are first obtained on the basis of the three-phase alternating current values iu, iv and iw input in Step S201 and the rotor phase α of the electric motor 4. Subsequently, d-axis and q-axis voltage command values vd, vq are calculated from deviations between the d-axis and q-axis current command values id*, iq* and the d-axis and q-axis currents id, iq. It should be noted that a non-interference voltage necessary to cancel out an interference voltage between d-q orthogonal coordinate axes may be added to the calculated d-axis and q-axis voltage command values vd, vq.

Subsequently, three-phase alternating-current voltage command values uv, vv and vw are obtained from the d-axis and q-axis voltage command values vd, vq and the rotor phase α of the electric motor 4. Then, PWM signals tu (%), tv (%) and tw (%) are obtained from the obtained three-phase alternating-current voltage command values vu, vv and vw and the direct-current voltage value Vdc. By opening and closing the switching elements of the inverter 3 by the PWM signals tu, tv and tw obtained in this way, the electric motor 4 can be driven with a desired torque instructed by the torque command value Tm*.

Here, before describing the stop control process performed in Step S203, a transmission characteristic Gp(s) from the motor torque Tm to the motor rotation speed ωm is described in the control device for electric motor vehicle in the present embodiment.

Figure 4:
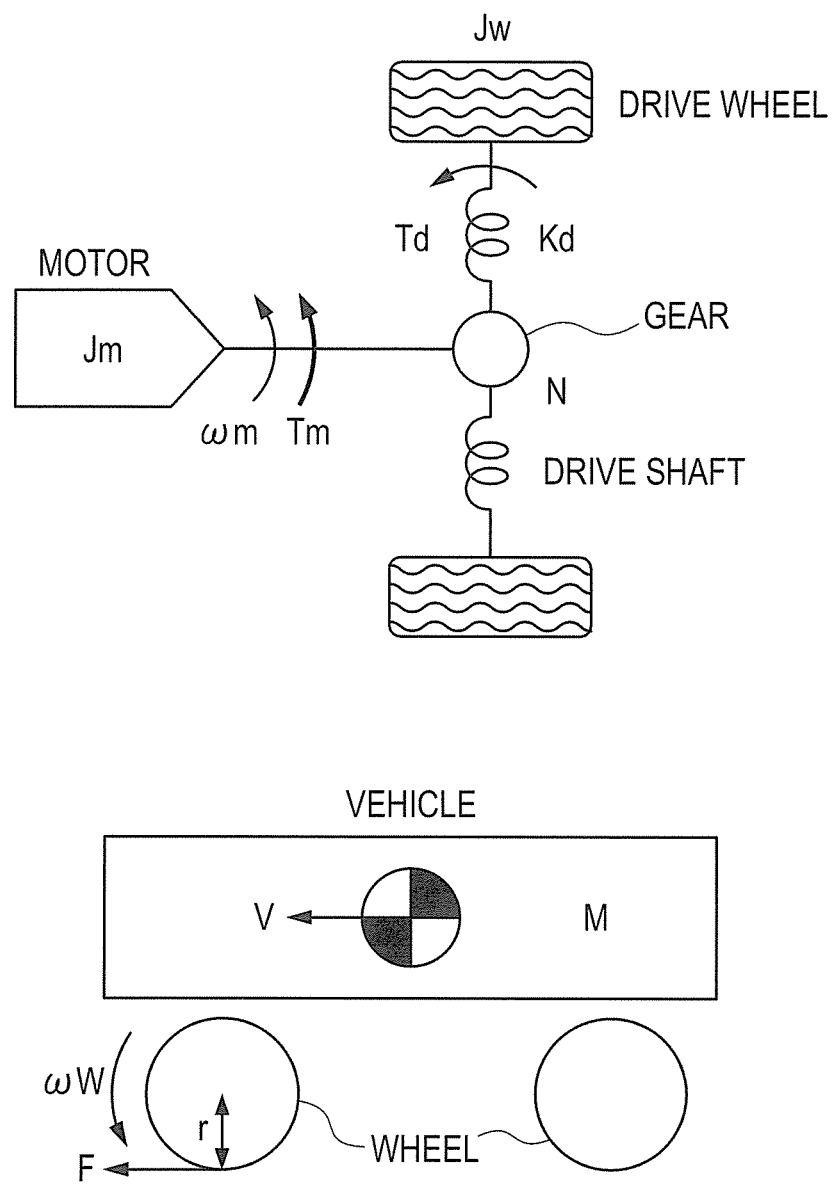
FIG. 4 is a diagram modeling a drive force transmission system of the vehicle.

FIG. 4 is a diagram modeling a drive force transmission system of the vehicle and each parameter in FIG. 4 is as below.
- $J_m$: inertia of electric motor
- $J_w$: inertia of drive wheels
- M: weight of vehicle
- $K_d$: torsional rigidity of drive system
- $K_t$: coefficient on friction between tires and road surface
- N: overall gear ratio
- r: load radius of tires
- $\omega_m$: angular velocity of electric motor
- $T_m$: torque target value
- $T_d$: torque of drive wheels
- F: force applied to vehicle
- V: speed of vehicle
- $\omega_w$: angular velocity of drive wheels The following motion equations can be derived from FIG. 4. However, asterisk (*) attached to the right-upper corner of a symbol in equations (1) to (3) indicates a time differential.

[Equation 1]

$$J_m \cdot \omega_m{}^* = T_m - T_d/N \quad (1)$$

[Equation 2]

$$2J_m \cdot \omega_m{}^* = T_d - rF \quad (2)$$

[Equation 3]

$$M \cdot V^* = F \quad (3)$$

[Equation 4]

$$T_d = K_d \cdot \int(\omega_m/N - \omega_w) dt \quad (4)$$

[Equation 5]

$$F = K_t \cdot (r\omega_w - V) \quad (5)$$

The transmission characteristic Gp(s) from the torque target value Tm to the motor rotation speed ωm of the electric motor 4 obtained on the basis of the motion equations (1) to (5) is expressed by the following equation (6).

[Equation 6]

$$G_p(s) = \frac{b_3 s^3 + b_2 s^2 + b_1 s + b_0}{s(a_4 s^3 + a_3 s^2 + a_2 s + a_1)} \quad (6)$$

where each parameter in equation (6) is expressed by the following equations (7).

[Equations 7]

$$a_4 = 2J_m J_w M$$

$$a_3 = J_m(2J_w + Mr^2)K_t$$

$$a_2 = (J_m + 2J_w/N^2) M \cdot K_d$$

$$a_1 = (J_m + 2J_w/N^2 + Mr^2/N^2) K_d \cdot K_t$$

$$b_3 = 2J_w \cdot M$$

$$b_2 = (2J_w \cdot Mr^2) K_t$$

$$b_1 = M \cdot K_d$$

$$b_0 = K_d \cdot K_t \quad (7)$$

The poles and zero point of the transmission function shown in equation (6) can be approximated to a transmission function of the following equation (8) and one pole and one zero point indicate values extremely close to each other. This is equivalent to that α and β of the following equation (8) indicate values extremely close to each other.

[Equation 8]

$$G_p(s) = \frac{(s+\beta)(b'_2 s^2 + b'_1 s + b'_0)}{s(s+\alpha)(a'_3 s^2 + a'_2 s + a'_1)} \quad (8)$$

Accordingly, by performing pole-zero cancellation (approximation to α=β) in equation (8), the transmission characteristic Gp(s) constitutes a transmission characteristic of (second order)/(third order) as shown in the following equation (9).

[Equation 9]

$$G_p(s) = \frac{(b'_2 s^2 + b'_1 s + b'_0)}{s(a'_3 s^2 + a'_2 s + a'_1)} \quad (9)$$

In this way, the transmission characteristic Gp(s) is derived on the basis of a vehicle model shown in FIG. 4. By simplifying the vehicle model of the transmission characteristic Gp(s), a simplified vehicle model Gp'(s) is expressed by the following equation (10).

[Equation 10]

$$G'_p(s) = \frac{b'_0}{a'_1 s} \quad (10)$$

It should be noted that although $a_1'$ and $b_0'$ in equation (9) are used as coefficients of the simplified vehicle model Gp'(s) in the present embodiment, $a_1$ and $b_0$ in equation (6) may be used instead of $a_1'$ and $b_0'$.

Figure 5:
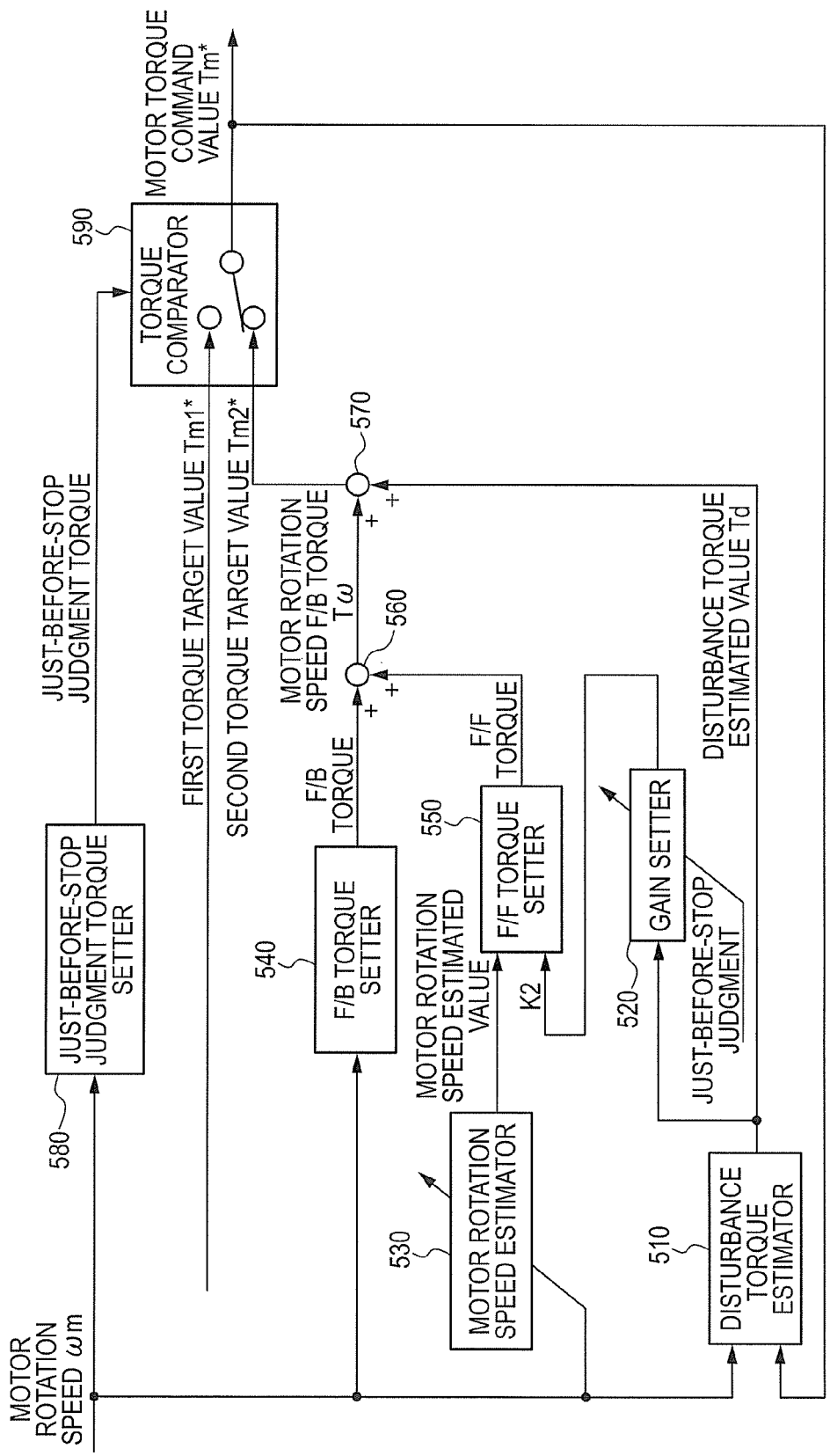
FIG. 5 is a block diagram for realizing a stop control process.

Next, the detail of the stop control process performed in Step S203 of FIG. 2 is described. FIG. 5 is a block diagram for realizing the stop control process. FIG. 5 shows a disturbance torque estimator 510, a gain setter 520, a motor rotation speed estimator 530, an F/B torque setter 540, an F/F torque setter 550, an adder 560, an adder 570, a just-before-stop judgment torque setter 580 and a torque comparator 590. Feedback is written as "F/B" and feedforward is written as "F/F" below.

The disturbance torque estimator 510 estimates a disturbance torque applied to the electric motor 4 from the electric motor vehicle. It should be noted that the estimated value of the disturbance torque is referred to as a "disturbance torque estimated value Td" below. The disturbance torque estimator 510 calculates the disturbance torque estimated value Td on the basis of the detected motor rotation speed ωm and motor torque command value Tm*. Then, the disturbance torque estimator 510 outputs the disturbance torque estimated value Td to the adder 570 and the gain setter 520.

Figure 6:
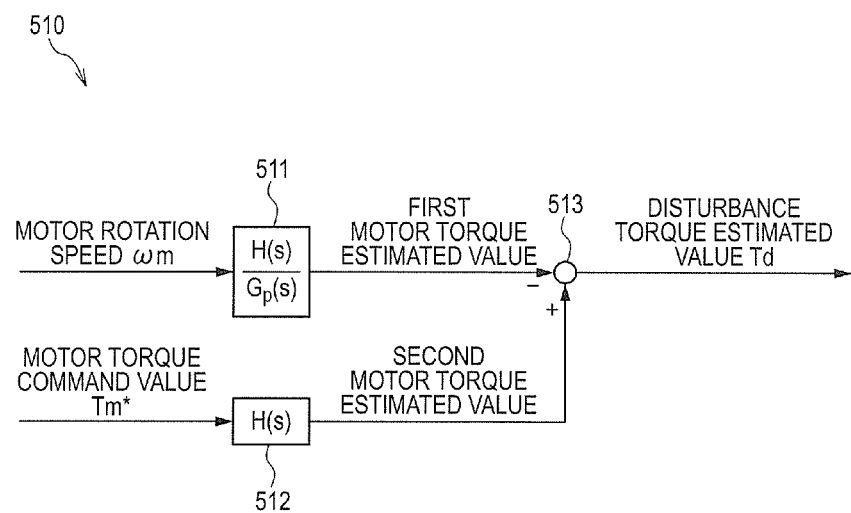
FIG. 6 is a block diagram showing a method for calculating a disturbance torque estimated value on the basis of a motor rotation speed and a motor torque command value.

FIG. 6 is a block diagram showing a method for calculating the disturbance torque estimated value Td on the basis of the motor rotation speed ωm and the motor torque command value Tm*.

A control block 511 functions as a filter having a transmission characteristic H(s)/Gp(s) and calculates a first motor torque estimated value by filtering the input motor rotation speed ωm. Gp(s) is the vehicle model of the transmission characteristic of the torque input to the vehicle and the motor rotation speed, and H(s) is a low-pass filter having such a transmission characteristic that a difference between the denominator degree and the numerator degree thereof is not smaller than a difference between the denominator degree and the numerator degree of Gp(s).

A control block 512 functions as a low-pass filter having the transmission characteristic H(s) and calculates a second motor torque estimated value by filtering the input motor torque command value Tm*.

The subtractor 513 calculates the disturbance torque estimated value by subtracting the first motor torque estimated value from the second motor torque estimated value.

It should be noted that although the disturbance torque is estimated by an disturbance observer as shown in FIG. 6 in the present embodiment, it may be estimated using a meter such as a vehicle longitudinal G sensor.

Here, air resistance, a modeling error caused by a variation of a vehicle mass due to the number of passengers and load capacity, rolling resistance of the tires, gradient resistance of the road surface and the like can be thought as disturbances, but a disturbance factor dominant just before the vehicle stops is gradient resistance. Disturbance factors differ depending on driving conditions, but the disturbance factors described above can be collectively estimated since the disturbance torque estimator 510 calculates the disturbance torque estimated value Td on the basis of the motor torque command value Tm*, the motor rotation speed ωm and the vehicle model Gp(s). This enables the realization of a smooth vehicle stop from deceleration under any driving condition.

As just described, in the disturbance torque estimator 510, the first motor torque estimated value is calculated by inputting the motor rotation speed ωm to the filter having the transmission characteristic H(s)/Gp(s) composed of the model Gp(s) and such a transmission characteristic H(s) that the difference between the denominator degree and the numerator degree thereof is not smaller than a difference between the denominator degree and the numerator degree of the model Gp(s). Together with this, the motor torque command value Tm* is input to the filter having the transmission characteristic H(s) to calculate the second motor torque estimated value, and the disturbance torque estimated value Td is obtained by calculating a deviation between the first motor torque estimated value and the second motor torque estimated value. In this way, the disturbance torque estimated value Td can be accurately obtained.

Next, the configuration of the gain setter 520 shown in FIG. 5 is described.

The gain setter 520 adjusts a gain of a motor rotation speed F/B torque To for generating a regenerative braking force of the electric motor 4 so as to reduce rollover occurring on an uphill road just before the vehicle stops.

In the present embodiment, a feedforward torque (F/F torque) is added to the motor rotation speed F/B torque To for a smooth deceleration without oscillating the torque of the electric motor 4 just before the vehicle stops.

The gain setter 520 sets an F/F gain K2 for adjusting the F/F torque on the basis of the disturbance torque estimated value Td calculated in the disturbance torque estimator 510 when it is judged in Step S203 that the electric motor vehicle stops shortly. It should be noted that judgment as to whether or not the electric motor vehicle stops shortly is made by the torque comparator 590 to be described later.

Figure 7:
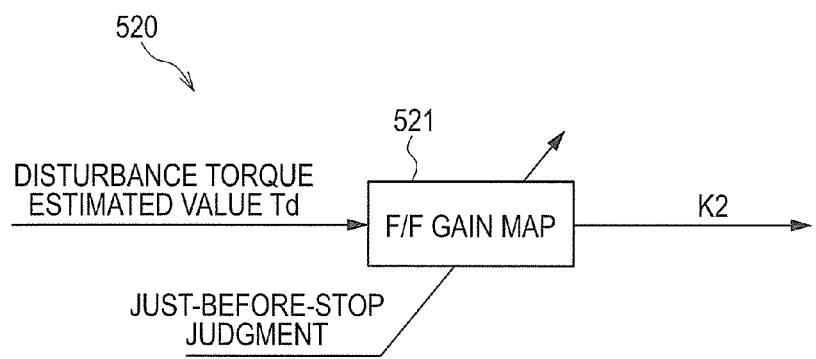
FIG. 7 is a diagram showing a method for calculating an F/F gain on the basis of the disturbance torque estimated value.

FIG. 7 is a diagram showing a method for calculating the F/F gain K2 on the basis of the disturbance torque estimated value Td.

The gain setter 520 includes a calculator 521 for converting the disturbance torque estimated value Td into the F/F gain K2. An F/F gain map is stored in the calculator 521 in advance.

The F/F gain map is a so-called gain scheduling map and the value of the F/F gain K2 is associated with each disturbance torque estimated value Td.

The gain setter 520 calculates the F/F gain K2 corresponding to the disturbance torque estimated value Td by referring to the F/F gain map when it is judged that the electric motor vehicle stops shortly.

Figure 8:
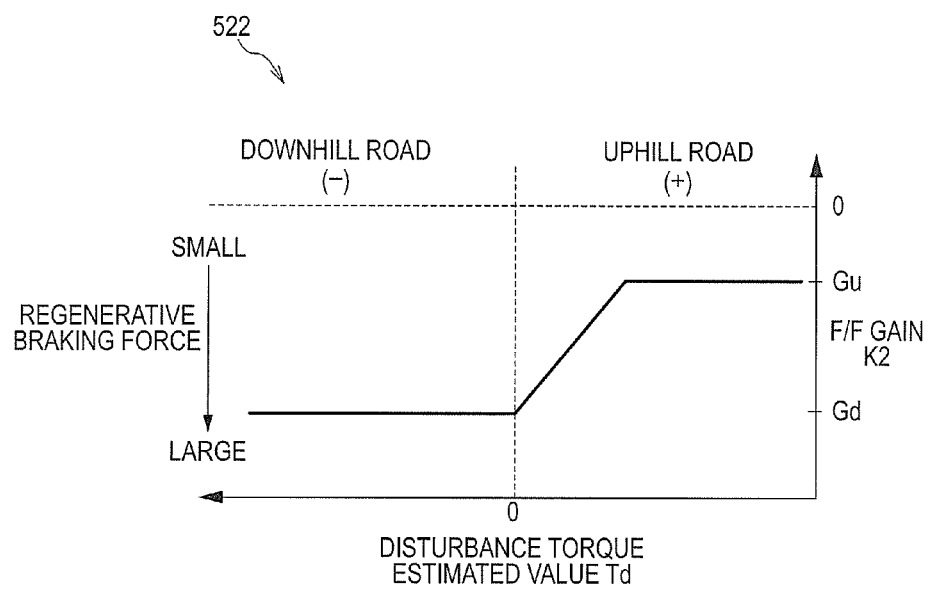
FIG. 8 is a conceptual diagram showing an example of an F/F gain map.

FIG. 8 is a diagram showing an F/F gain map 522 retained in the calculator 521. In FIG. 8, a horizontal axis represents the disturbance torque estimated value Td and the vertical axis represents the magnitude of the F/F gain K2.

In the F/F gain map 522, the F/F gain K2 is set at a constant reference value Gd when the disturbance torque estimated value Td is not larnger than zero, i.e. on a downhill road or a flat road.

On the other hand, when the disturbance torque estimated value Td is larger than zero, i.e. on an uphill road, a region having a strong nonlinearity due to the backlash of a gear just before the vehicle stops is crossed over and rollover occurs in the front-back direction of the electric motor vehicle. As a measure against this, the absolute value of the F/F gain K2 is made smaller than on downhill and flat roads to reduce the regenerative braking force of the electric motor 4 when the vehicle stops on an uphill road.

On the uphill road, the F/F gain K2 becomes larger than the reference value Gd as the disturbance torque estimated value Td becomes larger than zero. When an upper limit value Gu is reached, the F/F gain K2 is fixed at the upper limit value Gu.

As just described, when it is judged that the electric motor vehicle stops shortly, the calculator 521 judges whether or not the road surface is uphill on the basis of the disturbance torque estimated value Td by referring to the F/F gain map 522. If the road surface is judged to be uphill, the absolute value of the F/F gain K2 is reduced to make the regenerative braking force of the electric motor 4 smaller than on the downhill road.

Further, after calculating the F/F gain K2 when it is judged that the vehicle stops shortly, the calculator 521 fixes the calculated value of the F/F gain K2 and continues to output it to the F/F torque setter 550 until the electric motor vehicle stops after calculation. Specifically, the disturbance torque estimated value Td when it was judged that the vehicle would stop shortly is output to the F/F torque setter 550 until the vehicle stops.

Next, the configuration of the motor rotation speed estimator 530 shown in FIG. 5 is described.

The motor rotation speed estimator 530 estimates the rotation speed of the electric motor 4 by an open loop.

Hereinafter, the estimated value of the rotation speed of the electric motor 4 is referred to as a "motor rotation speed estimated value".

Figure 9:
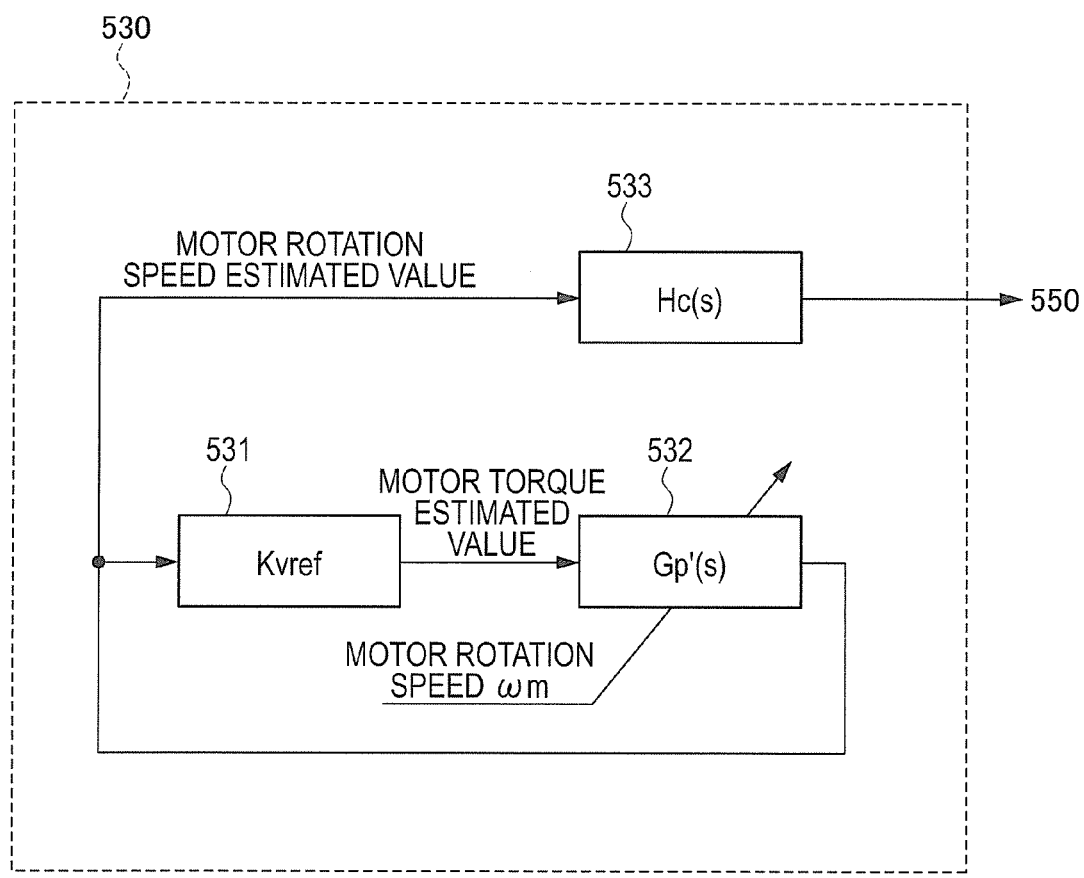
FIG. 9 is a diagram showing a method for calculating a motor rotation speed estimated value.

FIG. 9 is a diagram showing a method for calculating the motor rotation speed estimated value according to the state of the electric motor vehicle. The motor rotation speed estimator 530 includes a motor torque estimation unit 531, a motor rotation speed calculation unit 532 and a low-pass filter 533.

The motor torque estimation unit 531 calculates the motor torque estimated value by multiplying the motor rotation speed estimated value by a predetermined gain (hereinafter, referred to as a "total gain") Kvref used in the calculation of the motor rotation speed F/B torque.

The total gain Kvref is a predetermined negative (minus) value for smoothly decelerating the electric motor vehicle while suppressing a braking distance, and appropriately set, for example, by experimental data. The motor torque estimation unit 531 outputs the motor torque estimated value to the motor rotation speed calculation unit 532. Since the motor torque estimated value works as a viscous (damper) element for a dynamic characteristic from the motor torque estimated value to the motor rotation speed estimated value, the motor rotation speed estimated value smoothly (asymptotically) converges to zero just before the vehicle stops. This enables the realization of a smooth vehicle stop free from any shock to longitudinal acceleration.

The motor rotation speed calculation unit 532 converts the motor torque estimated value into the motor rotation speed estimated value on the basis of the vehicle model Gp(s) shown in equation (6). In the present embodiment, the simplified vehicle model Gp'(s) shown in equation (10) is used instead of the vehicle model Gp(s).

The motor rotation speed calculation unit 532 calculates the motor rotation speed estimated value on the basis of the simplified vehicle model Gp'(s) by inputting the motor torque estimated value to the simplified vehicle model Gp'(s). The motor rotation speed calculation unit 532 outputs the motor rotation speed estimated value based on the simplified vehicle model Gp'(s) to the motor torque estimation unit 531 and the low-pass filter 533.

The low-pass filter 533 is a filter having a transmission characteristic Hc(s) set to complement the simplified vehicle model Gp'(s). The transmission characteristic Hc(s) is set on the basis of simulation, experimental data or the like. Specifically, a time constant of the transmission characteristic Hc(s) is adjusted so that the convergence of the motor rotation speed estimated value input to the F/F torque setter 550 is equal to that of the motor rotation speed $\omega$m in a state where the total gain Kvref is smaller than zero.

Since this causes low-pass filtering to be applied to the motor rotation speed estimated value input to the F/F torque setter 550 by the low-pass filter 533, a shift of a response characteristic associated with the use of the simplified vehicle model Gp'(s) is corrected. Thus, it is possible to reduce the amount of computation while ensuring the estimation accuracy of the motor rotation speed by the motor rotation speed estimator 530.

As just described, in the motor rotation speed estimator 530, the motor rotation speed estimated value is calculated on the basis of the vehicle model Gp(s) and the motor torque estimated value converges to zero with a reduction in the motor rotation speed estimated value. Thus, in the motor rotation speed estimator 530, the motor rotation speed estimated value can be obtained just before the electric motor vehicle stops.

It should be noted that the motor rotation speed calculation unit 532 initializes the simplified vehicle model Gp'(s) on the basis of the motor rotation speed $\omega$m if it is judged by the torque comparator 590 to be described later that the electric motor vehicle is not just before the stop and travels some time before that. For example, the simplified vehicle model Gp'(s) is composed of constants a1' and b0' uniquely determined by design values of the vehicle and an integrator. If it is judged that the electric motor vehicle stops shortly, the simplified vehicle model Gp'(s) is initialized by setting an initial value of the above integrator as the motor rotation speed $\omega$m.

Next, the configuration of the F/B torque setter 540 shown in FIG. 5 is described.

The F/B torque setter 540 calculates an F/B torque for smoothly decelerating the electric motor vehicle by the regenerative braking force of the electric motor 4 on the basis of the detected motor rotation speed $\omega$m.

Figure 10:
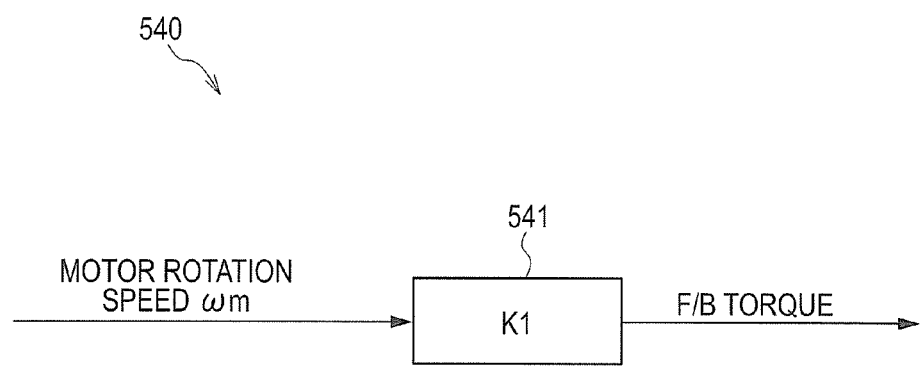
FIG. 10 is a diagram showing a method for calculating an F/B torque on the basis of the detected motor rotation speed.

FIG. 10 is a diagram showing a method for calculating the F/B torque on the basis of the motor rotation speed $\omega$m.

The F/B torque setter 540 includes a multiplier 541 for converting the motor rotation speed $\omega$m into the F/B torque.

The multiplier 541 calculates the F/B torque by multiplying the motor rotation speed $\omega$m by an F/B gain K1 determined to distribute the regenerative braking force of the electric motor 4.

The F/B gain K1 is set in a direction to weaken the regenerative braking force with respect to the total gain Kvref. Specifically, the F/B gain K1 is set at a value smaller than zero and larger than the total gain Kvref.

In the present embodiment, the F/B gain K1 is a value obtained by subtracting the F/F gain K2 from the total gain Kvref. Specifically, the F/B gain K1 is set at a value obtained by subtracting the reference value Gd of the F/F gain on the downhill road from the total gain Kvref.

It should be noted that although the F/B torque setter 540 is described to calculate the F/B torque by multiplying the motor rotation speed $\omega$m by the F/B gain K1, the F/B torque may be calculated using a regenerative torque table defining a regenerative torque in relation to the motor rotation speed $\omega$m, an attenuation rate table storing an attenuation rate of the motor rotation speed $\omega$m in advance or the like.

Next, the configuration of the F/F torque setter 550 shown in FIG. 5 is described.

The F/F torque setter 550 calculates the F/F torque on the basis of the motor rotation speed estimated value output from the motor rotation speed estimator 530. A shortage of the regenerative braking force caused by the F/B torque is compensated for by the F/F torque just before the vehicle stops.

Figure 11:
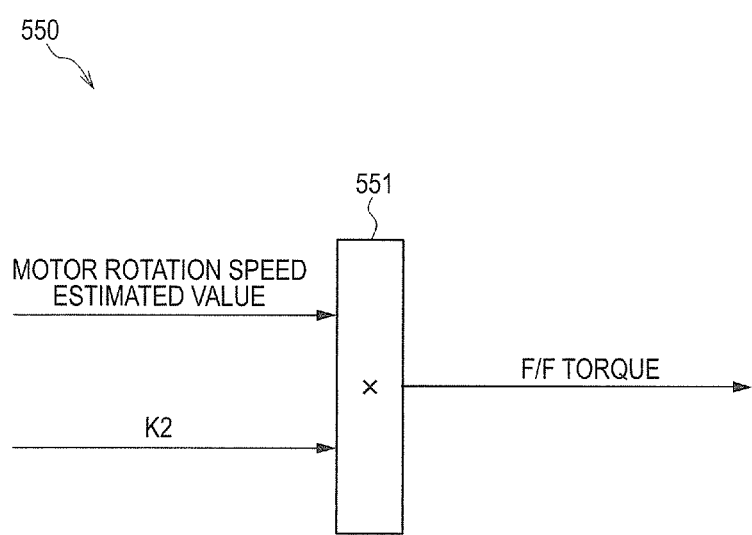
FIG. 11 is a diagram showing a method for calculating an F/F torque on the basis of the motor rotation speed estimated value.

FIG. 11 is a diagram showing a method for calculating the F/F torque on the basis of the motor rotation speed $\omega$m.

The F/F torque setter 550 includes a multiplier 551 for converting the motor rotation speed estimated value into the F/F torque.

The multiplier 551 calculates the F/F torque by multiplying the motor rotation speed $\omega$m by the F/F gain K2 output from the gain setter 520.

It should be noted that although the F/F torque setter 550 is described to calculate the F/F torque by multiplying the motor rotation speed estimated value by the F/F gain K2 in the present embodiment, the F/F torque may be calculated using the regenerative torque table defining a regenerative torque in relation to the motor rotation speed $\omega$m, the attenuation rate table storing an attenuation rate of the motor rotation speed estimated value in advance or the like.

Referring back to FIG. 5, it is continued to describe the configurations of the adder 560, the adder 570 and the just-before-stop judgment torque setter 580.

The adder 560 calculates the motor rotation speed F/B torque Tω by adding the F/B torque calculated in the F/B torque setter 540 and the F/F torque calculated in the F/F torque setter 550. By adding the F/F torque, it is possible to suppress the oscillation of the torque of the electric motor 4 while suppressing an increase of the braking distance.

The adder 570 calculates the second torque target value Tm2* for smoothly stopping the vehicle regardless of the gradient of the road surface by adding the motor rotation speed F/B torque To calculated in the adder 560 and the disturbance torque estimated value Td calculated in the disturbance torque estimator 510.

The just-before-stop judgment torque setter 580 calculates a just-before-stop judgment torque on the basis of the detected motor rotation speed ωm.

Figure 12:
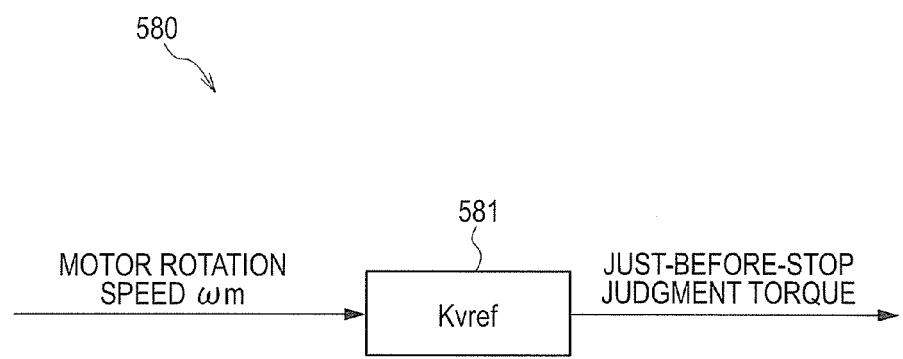
FIG. 12 is a block diagram showing a method for calculating a just-before-stop judgment torque on the basis of the motor rotation speed.

FIG. 12 is a block diagram showing a method for calculating the just-before-stop judgment torque on the basis of the motor rotation speed ωm.

The just-before-stop judgment torque setter 580 includes a multiplier 581 for converting the motor rotation speed ωm into the just-before-stop judgment torque.

The multiplier 581 calculates the just-before-stop judgment torque by multiplying the motor rotation speed ωm by the total gain Kvref.

Referring back to FIG. 5, the configuration of the torque comparator 590 is described.

The torque comparator 590 compares the magnitude of the first torque target value Tm1* calculated in Step S202 and that of the just-before-stop judgment torque calculated in the just-before-stop judgment torque setter 580.

The just-before-stop judgment torque is smaller than the first torque target value Tm1* during the travel of the vehicle and becomes larger than the first torque target value Tm1* when the vehicle decelerates and stops shortly (vehicle speed is not higher than a predetermined vehicle speed). The torque comparator 590 judges that the vehicle stops shortly and switches the motor torque command value Tm* from the first torque target value Tm1* to the second torque target value Tm2* when the just-before-stop judgment torque becomes larger than the first torque target value Tm1*.

As just described, the torque comparator 590 sets the first torque target value Tm1* as the motor torque command value Tm* by determining that a moment just before the vehicle stops has not been reached yet if the just-before-stop judgment torque is judged to be equal to or smaller than the firsts torque target value Tm1*. On the other hand, the torque comparator 590 judges that the vehicle stops shortly and switches the motor torque command value Tm* from the first torque target value Tm1* to the second torque target value Tm2* if the just-before-stop judgment torque is judged to be larger than the first torque target value Tm1*.

It should be noted that the second torque target value Tm2* is a positive torque on an uphill road, a negative torque on a downhill road and converges substantially to zero on a flat road to maintain the vehicle stopped state.

Further, the torque comparator 590 switches a judgement flag thereof from an L (Low) level to an H (High) level when judging that the vehicle stops shortly. Then, the gain setter 520 calculates the F/F gain K2 on the basis of the disturbance torque estimated value Td and sets the calculated value in the F/F torque setter 550 when the judgment flag is set to the H level.

For example, when the disturbance torque estimated value Td is larger than zero, i.e. when the road surface is uphill, the regenerative braking force of the electric motor 4 is reduced by setting the F/F gain K2 at a value larger than the reference value Gd as shown in FIG. 8. In this way, G jerk caused by the backlash of the gear and the like can be suppressed when the vehicle stops on the uphill road.

Next, effects obtained by reducing the total gain Kvref of the motor rotation speed F/B torque To in the case of stopping the vehicle on an uphill road are described with reference to the drawings.

FIGS. 13A to 13D are time charts when the stop control process is performed without changing the total gain Kvref on an uphill road.

FIGS. 13A to 13D respectively show changes of the motor torque command value Tm*, the motor rotation speed ωm, the longitudinal acceleration (G) and the G jerk until the electric motor vehicle stops after starting to decelerate on the uphill road, wherein a horizontal axis is a time axis common to each other. It should be noted that the disturbance torque estimated value Td is shown by a broken line in FIG. 13A.

The G jerk represents a change rate of longitudinal G per unit time. In the case of stopping the vehicle on the uphill road, rollover in the front-back direction of the vehicle occurs due to the pitching of the gear. A driver more easily feels rollover as the G jerk becomes larger.

At time t0, the electric motor vehicle is judged to stop shortly by the torque comparator 590 and the stop control process is performed. Since this causes the second torque target value Tm2* to be set as the motor torque command value Tm*, the electric motor vehicle brakes according to the second torque target value Tm2*. Here, the total gain Kvref is a fixed value regardless of the disturbance torque command value Td.

Figure 13A:
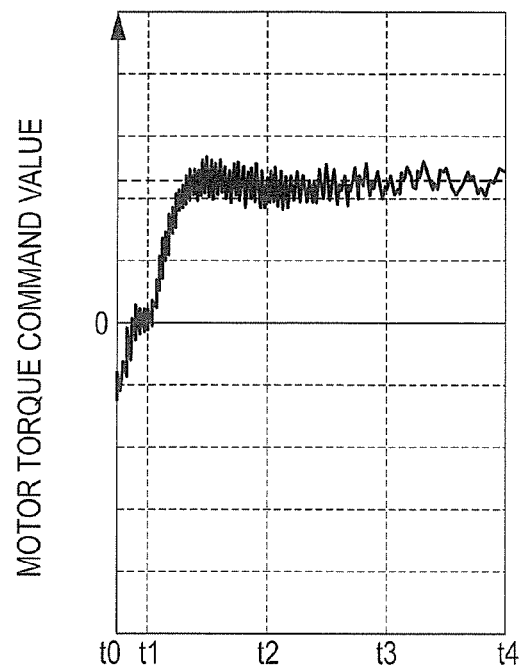
FIG. 13A is a chart showing a motor torque command value when the stop control process is performed without changing a total gain on an uphill road.
Figure 13B:
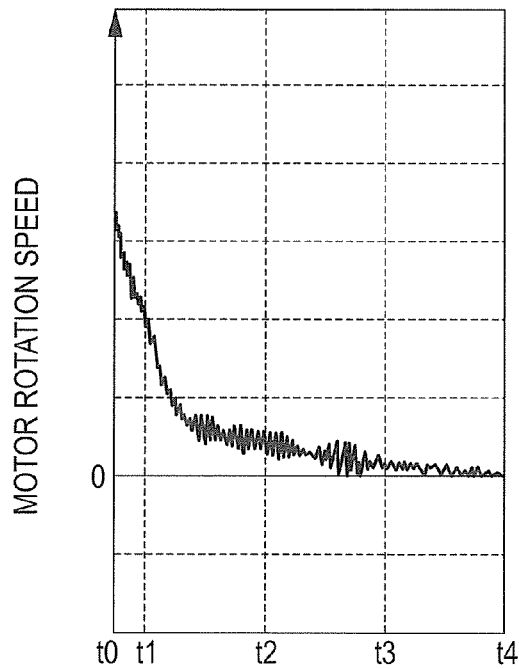
FIG. 13B is a chart showing the motor rotation speed by the stop control process performed in FIG. 13A.
Figure 13C:
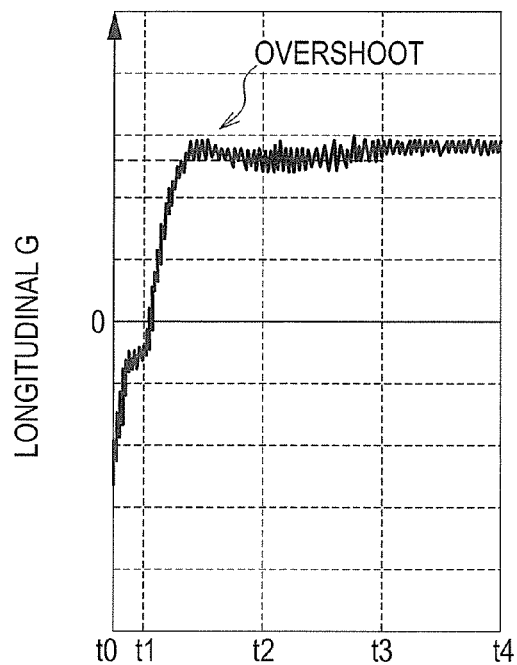
FIG. 13C is a chart showing longitudinal acceleration by the stop control process performed in FIG. 13A.

At time t1, since the motor torque command value Tm* and the longitudinal G are both substantially zero as shown in FIGS. 13A and 13C, a gear backlash zone is crossed over. Specifically, a region of the motor torque command value Tm* having a strong nonlinearity is crossed over.

Figure 13D:
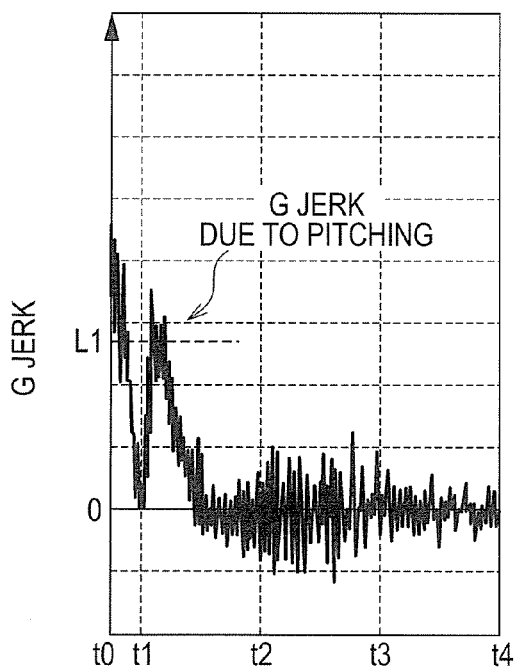
FIG. 13D is a chart showing G jerk by the stop control process performed in FIG. 13A.

From time t1 to time t2, the longitudinal G is found to overshoot as shown in FIG. 13C due to the influence of crossing over the gear backlash zone. Thus, as shown in FIG. 13D, the G jerk temporarily increases to "L1".

From time t2 to time t4, the electric motor vehicle brakes according to the second torque target value Tm2* set as the motor torque command value Tm* by the stop control process.

At and after time t4, the stopped state of the electric motor vehicle is held since the second torque target value Tm2* is set at the disturbance torque estimated value Td.

As just described, if the total gain Kvref is fixed regardless of the gradient of the road surface, the overshoot of the longitudinal G occurs, the G jerk increases to L1 and the driver strongly feels rollover on the uphill road.

FIGS. 14A to 14D are time charts showing an example of control results by the control device for electric motor vehicle in the one embodiment.

Similarly to FIGS. 13A to 13D, FIGS. 14A to 14D respectively show changes of the motor torque command value Tm*, the motor rotation speed ωm, the longitudinal acceleration (G) and the G jerk, wherein a horizontal axis is a time axis common to each other.

At time t0, the electric motor vehicle is judged to stop shortly by the torque comparator 590 and the stop control process is performed. Since this causes the second torque target value Tm2* to be set as the motor torque command value Tm*, the electric motor vehicle brakes according to the second torque target value Tm2*.

Here, since the road surface is uphill, the disturbance torque estimated value Td when the vehicle is judged to stop shortly is a positive value and the second torque target value Tm2* is a positive value. In the present embodiment, the F/F gain K2 used in the calculation of the motor rotation speed F/B torque To is set to make the regenerative braking force smaller than on flat and downhill roads when the disturbance torque command value Td at the time of judging that the vehicle stops shortly is smaller than zero, i.e. on the uphill road as shown in FIG. 8.

Figure 14A:
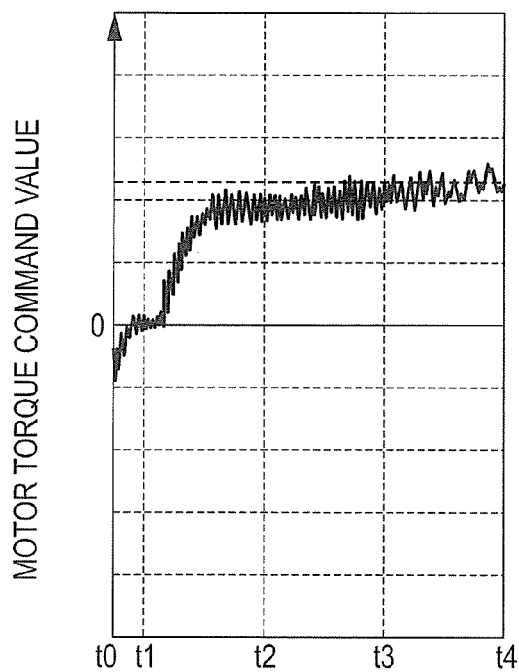
FIG. 14A is a chart showing the motor torque command value out of control results by the control device for electric motor vehicle in the one embodiment.
Figure 14B:
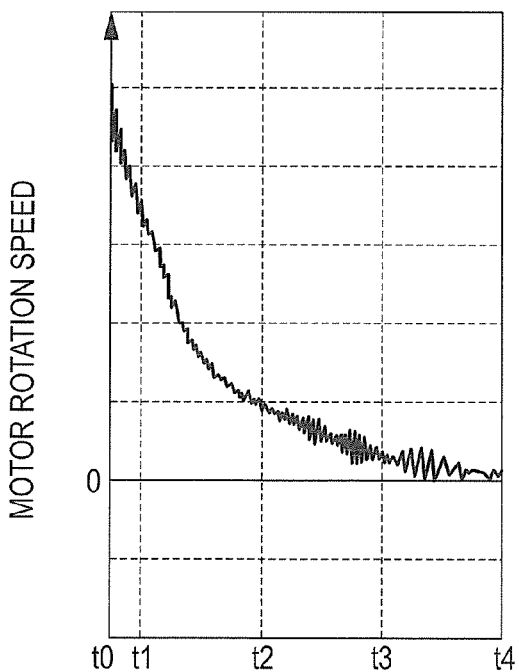
FIG. 14B is a chart showing the motor rotation speed out of the control results.
Figure 14C:
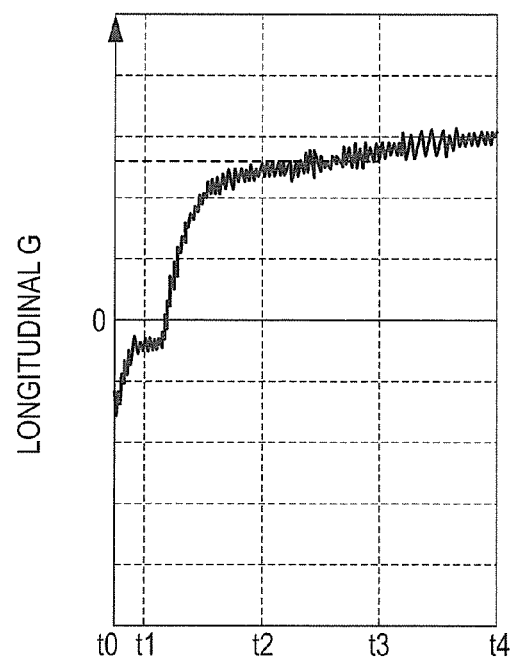
FIG. 14C is a chart showing the longitudinal acceleration by the control results.

At time t1, since the motor torque command value Tm* and the longitudinal G are both substantially zero as shown in FIGS. 14A and 14C, the gear backlash zone is crossed over.

From time t1 to time t2, since the total gain of the motor rotation speed F/B torque To is adjusted according to the disturbance torque estimated value Td, a degree of change of the motor torque command value Tm* is more moderate than that in FIG. 13A as shown in FIG. 14A. Thus, in FIG. 14C, the overshoot of the longitudinal G is suppressed and the longitudinal G more smoothly changes than in FIG. 13C.

Figure 14D:
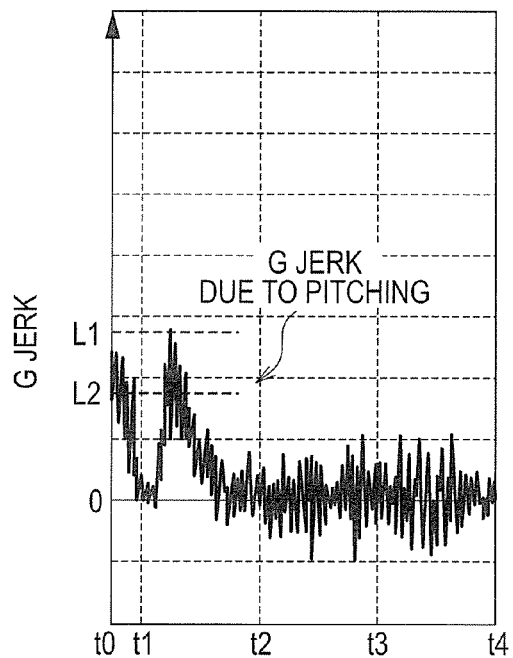
FIG. 14D is a chart showing the G jerk by the control results.

Since this causes a temporarily increasing level of the G jerk to be reduced to L2 from the increased level L1 shown in FIG. 13D as shown in FIG. 14D, it is found that the strength of the rollover felt by the diver is suppressed.

From time t2 to time t4, the electric motor vehicle brakes according to the second torque target value Tm2* set as the motor torque command value Tm* by the stop control process.

At and after time t4, the stopped state of the electric motor vehicle is held since the second torque target value Tm2* is set at the value obtained by reversing the sign of the disturbance torque estimated value Td.

As just described, the overshoot of the longitudinal G just before the vehicle stops can be suppressed by reducing the total gain Kvref used in the stop control process according to the disturbance torque estimated value on the uphill road crossing over the region having a strong nonlinearity caused by the backlash of the gear and the like. Since the G jerk is suppressed in this way, the rollover felt by the driver can be suppressed.

Here, although the F/F gain K2 out of the total gain Kvref is changed on the basis of the disturbance torque estimated value Td in the above description, the F/B gain K1 may be changed on the basis of the disturbance torque estimated value Td. An example of setting the F/B gain K1 on the basis of the disturbance torque estimated value Td is described below.

Figure 15:
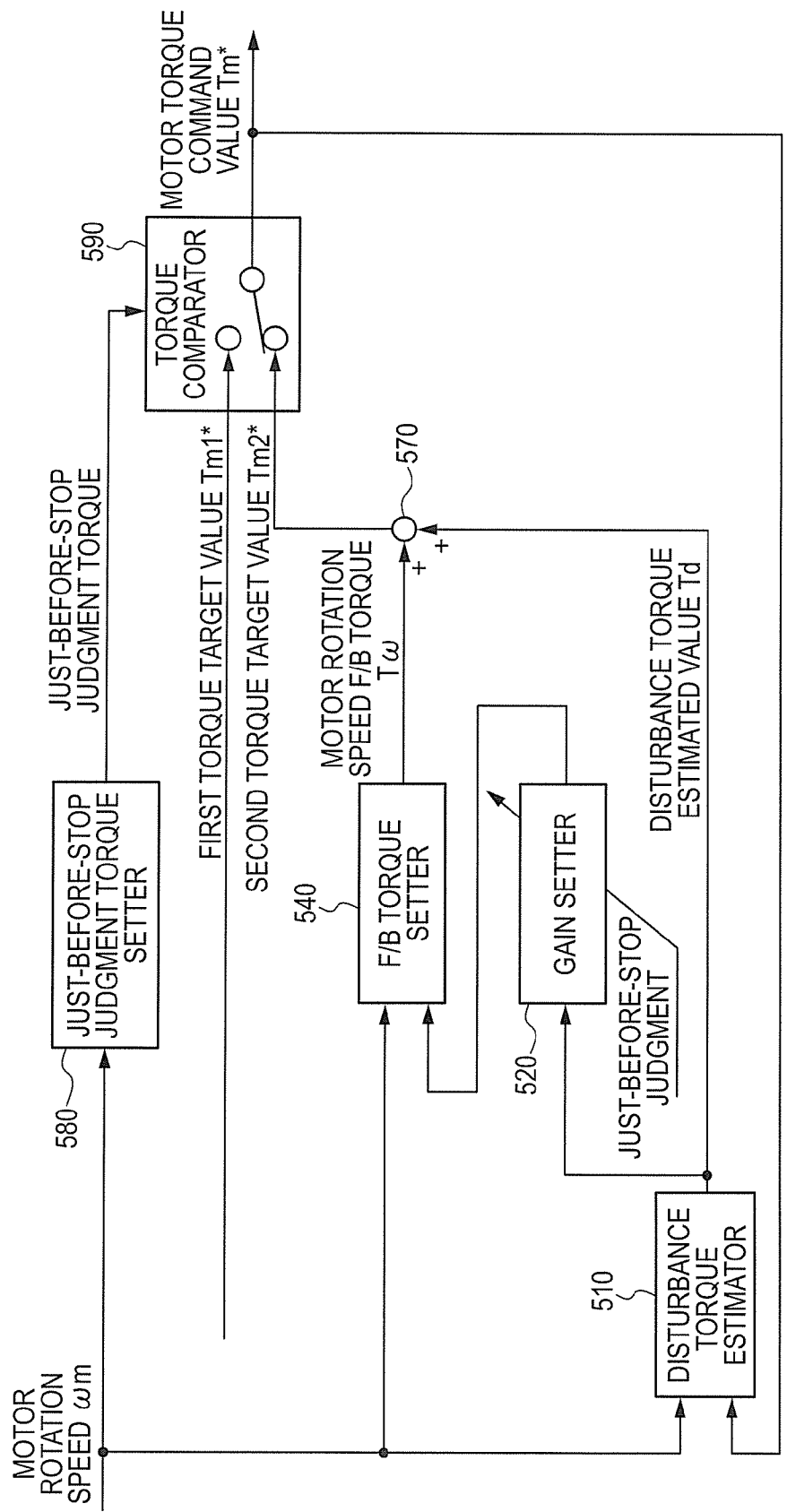
FIG. 15 is a block diagram for realizing the stop control process when a motor rotation speed F/B torque is set as a second torque target value Tm2* without using the F/F torque in conjunction.

FIG. 15 is a block diagram for realizing the stop control process when the motor rotation speed F/B torque Tω is set as the second torque target value Tm2* without using the F/F torque in conjunction. In FIG. 15, the same constituent elements as those shown in FIG. 5 are denoted by the same reference signs.

Figure 16:
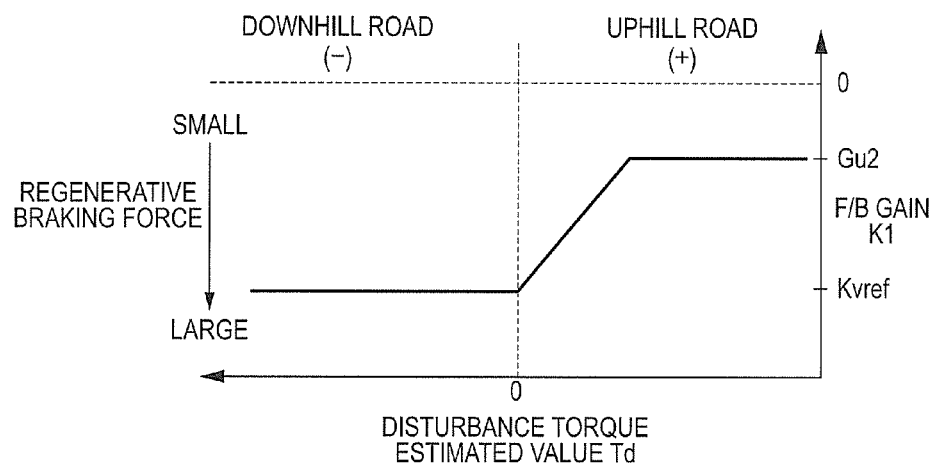
FIG. 16 is a conceptual diagram showing an example of an F/B gain map.

Also in the case of setting the F/B gain K1 of the motor rotation speed F/B torque Tω on the basis of the disturbance torque estimated value Td, the second torque target value Tm2* can be moderately changed by reducing a degree of change of the motor rotation speed F/B torque Tω on the uphill road. For example, the second torque target value Tm2* set as the motor torque command value Tm* more moderately changes than on the downhill road by setting the total gain Kvref as the F/B gain K1 and setting the F/B gain K1 on the uphill road as shown in FIG. 16.

As described above, the control device for electric motor vehicle in the one embodiment is a control device for electric motor vehicle using the electric motor 4 as a traveling drive source and configured to decelerate by the regenerative braking force of the electric motor 4 when an accelerator operation amount decreases or becomes zero, detects the accelerator operation amount, calculates the motor torque command value and controls the electric motor 4 on the basis of the calculated motor torque command value.

Together with this, the control device detects the motor rotation speed ωm as a speed parameter proportional to the traveling speed of the electric motor vehicle, calculates the motor rotation speed F/B torque Tω for stopping the electric motor vehicle on the basis of the motor rotation speed ωm and estimates the disturbance torque acting on the electric motor 4 from the electric motor vehicle.

When the accelerator operation amount decreases or becomes zero and the electric motor vehicle stops shortly, the motor torque command value Tm* is converged to the disturbance torque on the basis of the motor rotation speed F/B torque Tω as the speed parameter proportional to the traveling speed is reduced.

Since the disturbance torque is estimated to be a positive value on the uphill road and a negative value on the downhill road, the vehicle smoothly stops also on slopes and the vehicle stopped state can be held without requiring foot braking. Further, since the disturbance torque is estimated to be zero on the flat road, the vehicle can smoothly stop and the vehicle stopped state can be held without requiring foot braking on the flat road.

In this way, regardless of the uphill road, the downhill road or the flat road, a smooth deceleration free from acceleration vibration in the front-back direction of the electric motor vehicle can be realized just before the vehicle stops and the vehicle stopped state can be held.

Further, in the present embodiment, the degree of change of the motor rotation speed F/B torque Tω, i.e. a response characteristic is adjusted according to the disturbance torque. In the case of stopping the electric motor vehicle on the uphill road, rollover in the front-back direction of the vehicle due to the pitching of the gear is larger than in the case of stopping the vehicle on the flat road. Specifically, the region having a strong nonlinearity due to the backlash of the gear and the like is crossed over on the uphill road.

By adjusting the degree of change of the motor rotation speed F/B torque Tω according to the disturbance torque including the traveling resistance such as the road surface gradient as a measure against this, a deceleration just before the vehicle stops can be arbitrarily adjusted. Thus, a change of the motor rotation speed F/B torque Tω can be made more moderate on the uphill road than on the flat and downhill roads. Therefore, the overshoot of the longitudinal G just before the vehicle stops due to the backlash of the gear and the like can be suppressed. Since the G jerk can be suppressed in this way, a vehicle stop with suppressed rollover felt by the driver can be realized.

Further, since the vehicle can be decelerated up to the vehicle stopped state even without using the braking force by mechanical braking means such as a foot brake, the regenerative operation of the electric motor 4 is possible also just before the vehicle stops and electric power consumption can be improved. Furthermore, since the acceleration/deceleration and the stop of the vehicle can be realized only by the accelerator operation, it is not necessary to switchingly depress the accelerator pedal and a brake pedal and burdens on the driver can be reduced.

In stopping the vehicle using the brake pedal, a driver not used to driving depresses the accelerator pedal too much to generate acceleration vibration in the front-back direction of the vehicle when the vehicle stops. Further, if it is attempted to realize the deceleration and the stop of the vehicle at a constant deceleration in the vehicle for realizing the acceleration/deceleration and the stop of the vehicle only by the accelerator operation, the deceleration needs to be increased to realize a sufficient deceleration during deceleration. Thus, acceleration vibration is generated in the front-back direction of the vehicle when the vehicle stops. However, according to the control device for electric motor vehicle in the one embodiment, any driver can realize a smooth deceleration and stop only by the accelerator operation as described above.

Further, in the control device for electric motor vehicle in the one embodiment, the motor rotation speed F/B torque Tω is calculated by multiplying the motor rotation speed ωm by the predetermined total gain Kvref for stopping the electric motor vehicle. Then, the total gain Kvref is changed on the basis of the disturbance torque.

By changing the total gain Kvref in this way, the motor rotation speed F/B torque Tω can be moderately changed. Thus, the degree of change of the motor rotation speed F/B torque Tω can be adjusted by a simple technique without performing a complicated arithmetic processing using an adjustment table or the like showing a relationship of the motor rotation speed ωm and the motor rotation speed F/B torque Tω.

For example, the control device for electric motor vehicle in the one embodiment sets the total gain Kvref to make the regenerative braking force smaller than on the flat and downhill roads when judging on the basis of the disturbance torque that the road surface is uphill. Since this makes a change of the motor torque command value Tm* moderate in the case of stopping the vehicle on the uphill road, the G jerk can be suppressed.

On the other hand, in the case of stopping the vehicle on the flat or downhill road, the total gain Kvref is not changed since the rollover in the front-back direction of the electric motor vehicle is weaker than on the uphill road. Thus, it is possible to suppress an increase of the braking distance while realizing a smooth deceleration.

Further, in the control device for electric motor vehicle in the one embodiment, the motor rotation speed is estimated and the F/F torque for compensating for the F/B torque is calculated on the basis of the estimated motor rotation speed estimated value. When the accelerator operation amount decreases or becomes zero and the electric motor vehicle stops shortly, the motor torque command value Tm* is converged to the disturbance torque on the basis of the motor rotation speed F/B torque Tω including the F/B torque and the F/F torque with a reduction in the traveling speed.

By using the F/F torque in conjunction with the F/B torque, it is possible to suppress the fluctuation of the motor torque command value Tm* when the vehicle stops by reducing the F/B torque and compensate for a shortage of the F/B torque by the F/F torque. Thus, the stability of a control system can be ensured without extending the braking distance.

Further, in the control device for electric motor vehicle in the one embodiment, the F/B torque is calculated by multiplying the motor rotation speed ωm by the predetermined gain K1 for distributing the regenerative braking force of the motor and the F/F torque is calculated by multiplying the motor rotation speed estimated value by the predetermined gain K2 set according to the gain K1. When the accelerator operation amount decreases or becomes zero and the electric motor vehicle stops shortly, the motor rotation speed F/B torque Tω obtained by adding the F/F torque to the F/B torque is set as the motor torque command value Tm*.

Since the motor rotation speed F/B torque Tω works as viscosity (damper), the motor rotation speed ωm smoothly (asymptotically) converges to zero just before the vehicle stops. In this way, a smooth vehicle stop free from shock to the longitudinal acceleration can be realized.

Further, in the control device for electric motor vehicle in the one embodiment, the gain K2 is set at the value obtained by subtracting the gain K1 from the total gain Kvref. Specifically, the gains K1 and K2 are set to satisfy the following relationship.

$$K_{vref} = K1 + K2 \quad (11)$$

By distributing the total gain Kvref to the gains K1 and K2 to satisfy the relationship of equation (11), the stability of the control system can be ensured without extending the braking distance. Thus, setting suitable for the system is possible.

Furthermore, in the control device for electric motor vehicle in the one embodiment, only the gain K2 is changed on the basis of the disturbance torque. If the gain K1 is reduced on the uphill road on the basis of the disturbance torque, the responsiveness of the electric motor 4 when the disturbance torque such as a gradient change is input is degraded. On the contrary, if the gain K1 is increased, the stability of an F/B system is reduced and the motor torque becomes oscillatory.

Thus, it is possible to set the total gain Kvref at a desired value and uniquely ensure stability and responsiveness for disturbances regardless of the uphill road, the flat road or the downhill road by fixing the gain K1 and changing only the gain K2.

For example, in the control device for electric motor vehicle in the one embodiment, the absolute value of the gain K2 is set to be small to make the regenerative braking force of the electric motor 4 smaller than on the flat road when the road surface is judged to be uphill on the basis of the disturbance torque. In this way, it is possible to suppress the degradation of the responsiveness of the electric motor 4 for disturbances while suppressing the rollover in the front-back direction of the electric motor vehicle due to the backlash of the gear in the case of stopping the vehicle on the uphill road.

According to the control device for electric motor vehicle in the one embodiment, the first torque target value Tm1* is calculated on the basis of vehicle information, the second torque target value Tm2* that converges to the disturbance torque with a reduction in the motor rotation speed ωm is calculated, the just-before-stop judgment torque is calculated by multiplying the motor rotation speed ωm by the total gain Kvref and the magnitude of the first torque target value Tm1* and that of the just-before-stop judgment torque are compared. If the just-before-stop judgment torque is judged to be larger than the first torque target value Tm1*, it is judged that the vehicle stops shortly and the motor torque command value Tm* is switched from the first torque target value Tm1* to the second torque target value Tm2*. In this way, a smooth deceleration can be realized without generating a torque difference at a timing of switching the torque target value at any gradient by a switch to the second torque target value Tm2* just before the vehicle stops after the vehicle is decelerated using the first torque target value Tm1* based on the vehicle information.

Further, if the just-before-stop judgment torque is judged to be larger than the first torque target value Tm1*, it is judged that the vehicle stops shortly, the gain of the motor rotation speed F/B torque To is set on the basis of the disturbance torque and the set gain is maintained until the vehicle stops.

By setting and fixing the total gain Kvref on the basis of the disturbance torque when it was judged that the vehicle would stop shortly in this way, a variation of the second torque target value Tm2* associated with a change of the disturbance torque can be prevented.

The present invention is not limited to the one embodiment described above. For example, the example of detecting the motor rotation speed as the speed parameter proportional to the traveling speed of the electric motor vehicle is described in the above description. However, since a wheel speed, a vehicle body speed, a rotation speed of the drive shaft and the like are also proportional to the traveling speed of the vehicle, they can be used as speed parameters.

For example, the wheel speed may be detected as the speed parameter proportional to the traveling speed of the electric motor vehicle, the F/B torque may be calculated on the basis of the wheel speed, the wheel speed may be estimated according to the state of the electric motor vehicle and the F/F torque may be calculated based on the estimated value. When the accelerator operation amount decreases or becomes zero and the electric motor vehicle stops shortly, the motor torque command value Tm* is converged to zero on the basis of the F/B torque and the F/F torque as the traveling speed obtained by the wheel speed is reduced. Even if the speed parameter other than the motor rotation speed is used in this way, effects similar to those of the present embodiment are obtained.

Further, the torque comparator 590 is described to determine that the vehicle stops shortly and switch the motor torque command value Tm* from the first torque target value Tm1* to the second torque target value Tm2* when judging that the just-before-stop judgment torque is larger than the first torque target value Tm1*. However, the torque comparator 590 may compare the magnitudes of the first and second torque target values Tm1*, Tm2* and set the larger value as the motor torque command value Tm*.

The invention claimed is:

1. A control device for an electric motor vehicle using an electric motor as a traveling drive source, the control device comprising:
    an accelerator pedal for instructing the acceleration/deceleration and stopping of the vehicle;
    a motor controller configured to:
        detect an accelerator operation amount indicating an operating state of the accelerator pedal;
        estimate a disturbance torque acting on the electric motor;
        detect a speed parameter proportional to a traveling speed of the electric motor vehicle;
        calculate a feedback torque for stopping the electric motor vehicle on a basis of the detected speed parameter;
        calculate a motor torque command value; and
        control the electric motor on a basis of the motor torque command value,
    wherein the electric motor is configured to decelerate, by a regenerative braking force of the electric motor, when the accelerator operation amount decreases or becomes zero;
    wherein the motor controller converges, as the speed parameter is reduced, the motor torque command value to the disturbance torque on a basis of the feedback torque when the accelerator operation amount decreases or becomes zero and the electric motor vehicle stops just before a stop of the vehicle; and
    wherein the motor controller adjusts the feedback torque according to the disturbance torque when the electric motor vehicle is decelerated and stops just before the stop of the vehicle by the operation of the accelerator pedal.

2. The control device for the electric motor vehicle according to claim 1, wherein:
    The motor controller calculates the feedback torque by multiplying the speed parameter by a predetermined gain for generating the regenerative braking force of the electric motor; and
    the predetermined gain is changed on a basis of the disturbance torque.

3. The control device for the electric motor vehicle according to claim 2, wherein the motor controller is configured to set the predetermined gain to make the regenerative braking force of the electric motor smaller than on a flat road when a road surface is judged to be uphill on the basis of the disturbance torque.

4. The control device for the electric motor vehicle according to claim 2, wherein the motor controller is configured to:
    calculate a first torque target value on a basis of vehicle information including an accelerator pedal opening and a motor rotation speed;
    calculate a second torque target value, the second torque target value converging to the disturbance torque on a basis of the feedback torque as the detected speed parameter is reduced;
    calculate a just-before-stop judgment torque by multiplying the detected speed parameter by the predetermined gain; and
    compare magnitudes of the first torque target value and the just-before-stop judgment torque,
    wherein the motor controller judges that the vehicle stop just before the stop of the vehicle, switches the motor torque command value from the first torque target value to the second torque target value, sets a gain of the feedback torque on the basis of the disturbance torque and maintains the gain until the vehicle stops when the just-before-stop judgment torque is judged to be larger than the first torque target value.

5. The control device for the electric motor vehicle according to claim 1, wherein the motor controller is configured to:
    estimate the speed parameter; and
    calculate a feedforward torque for compensating for the feedback torque on a basis of the estimated speed parameter,
    wherein the motor controller converges, as the speed parameter is reduced, the motor torque command value to the disturbance torque on a basis of the feedback torque and the feedforward torque when the accelerator operation amount decreases or becomes zero and the electric motor vehicle stops just before the stop of the vehicle.

6. The control device for the electric motor vehicle according to claim 5, wherein:
    the motor controller calculates the feedback torque by multiplying the detected speed parameter by a predetermined gain K1 for distributing the regenerative braking force of the electric motor;
    the motor controller calculates the feedforward torque by multiplying the estimated speed parameter by a predetermined gain K2, the gain K2 being set at a smaller value as the predetermined gain K1 increases; and the motor controller sets a speed feedback torque obtained by adding the feedforward torque to the feedback torque as the motor torque command value when the accelerator operation amount decreases or becomes zero and the electric motor vehicle stops just before the stop of the vehicle.

7. The control device for the electric motor vehicle according to claim 6, wherein the predetermined gain K2 is set at a value obtained by subtracting the predetermined gain K1 from a total gain Kvref determined to converge the speed feedback torque to zero.

8. The control device for the electric motor vehicle according to claim 6, wherein the motor controller is configured to change the predetermined gain K2 on a basis of the disturbance torque when the accelerator operation amount decreases or becomes zero and the electric motor vehicle stops just before the stop of the vehicle.

9. The control device for the electric motor vehicle according to claim 8, wherein the motor controller sets the predetermined gain K2 such that the regenerative braking force of the electric motor is smaller than on a flat road when a road surface is judged to be uphill on the basis of the disturbance torque.

10. A control method for an electric motor vehicle using an electric motor as a traveling drive source, the control method comprising:

detecting, by a motor controller, an accelerator operation amount indicating an operating state of an accelerator pedal for instructing acceleration/deceleration and stopping of the vehicle;

estimating, by the motor controller, a disturbance torque acting on the electric motor;

detecting, by the motor controller, a speed parameter proportional to a traveling speed of the electric motor vehicle;

calculating, by the motor controller, a feedback torque for stopping the electric motor vehicle on a basis of a detected speed parameter;

calculating, by the motor controller, a motor torque command value; and controlling, by the motor controller, the electric motor on a basis of the motor torque command value;

wherein the electric motor is configured to decelerate by a regenerative braking force of the electric motor when the accelerator operation amount decreases or becomes zero;

wherein the calculating the motor torque command value includes converging, as the speed parameter is reduced, the motor torque command value to the disturbance torque on a basis of the feedback torque when the accelerator operation amount decreases or becomes zero and the electric motor vehicle stops just before the stop of a vehicle; and wherein the calculating the feedback torque includes adjusting the feedback torque according to the disturbance torque when the electric motor vehicle is decelerated and stops just before the stop of the vehicle by the operation of the accelerator pedal.

* * * * *